United States Patent [19]
Nemeth

[11] 3,947,280
[45] Mar. 30, 1976

[54] SEMI-CONDUCTOR WITH MANGANESE OXIDE MATRIX

[75] Inventor: Joseph Nemeth, St. Clair Shores, Mich.

[73] Assignee: Champion Spark Plug Company, Toledo, Ohio

[22] Filed: Sept. 23, 1974

[21] Appl. No.: 508,237

[52] U.S. Cl. .................. 106/45; 106/65; 106/73.4; 252/519; 252/521
[51] Int. Cl.² ........................................ C04B 33/00
[58] Field of Search .............. 106/46, 65, 73.4, 45; 252/62.3, 62.3 ZB, 519, 521

[56] References Cited
UNITED STATES PATENTS

| | | | |
|---|---|---|---|
| 1,572,730 | 2/1926 | Locke | 106/46 |
| 2,120,338 | 6/1938 | McDougal | 106/46 |
| 2,152,656 | 4/1939 | McDougal | 106/46 |
| 2,290,107 | 7/1942 | Luks | 106/46 |
| 2,450,532 | 10/1948 | Tognola | 106/46 |
| 2,760,875 | 8/1956 | Schwartzwalder | 106/46 |
| 3,238,048 | 3/1966 | Somers | 106/46 |
| 3,291,619 | 12/1966 | Luks | 106/46 |
| 3,686,007 | 8/1972 | Gion | 106/46 |

Primary Examiner—Winston A. Douglas
Assistant Examiner—John F. Niebling
Attorney, Agent, or Firm—John C. Purdue; James D. McNeil

[57] ABSTRACT

An improved ceramic article useful after firing as an electrical suppressor element especially suitable for use in spark plugs is disclosed. The suppressor element is an aluminum-manganese oxide composition modified with a strontium compound which optionally may contain a nickel compound. The numerical value of the atom ratio of the article $$\frac{Sr + Al}{Mn + Ni}$$

is controlled from 0.1 to 1.5. The strontium/aluminum atom ratio has a value of from 0.5:1 to 0.95:1. The manganese constitutes from 50 percent to 100 percent based upon the total atoms of manganese and nickel present. The temperature coefficient of resistance of the suppressor, defined by $$n = 2.303 \log_{10} \frac{(R_2)}{(R_1)} \times \frac{(1)}{(T_2-T_1)} \times 100 \text{ in } \%/°C$$

is between about −2.8%/°C and −1.3%/°C.

1 Claim, 1 Drawing Figure

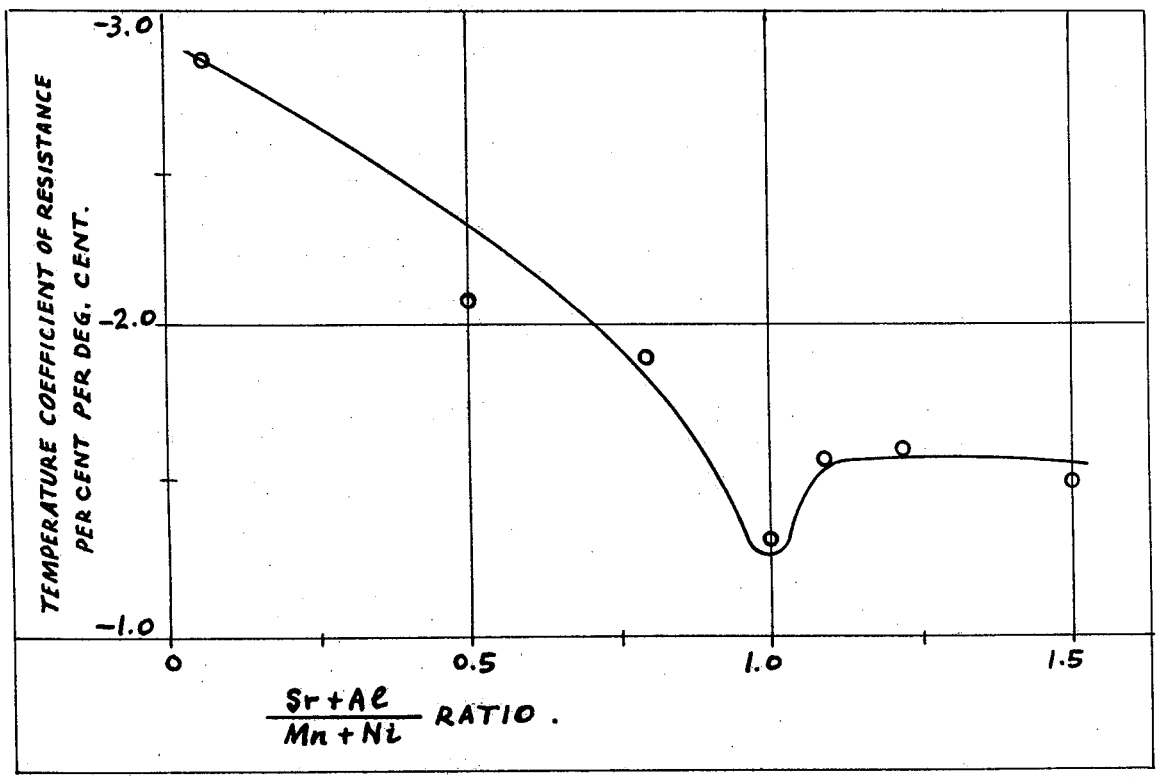
FIG-1-

SEMI-CONDUCTOR WITH MANGANESE OXIDE MATRIX

BACKGROUND OF THE INVENTION

This invention relates to a new and improved green ceramic article which can be fired to produce an improved suppressor for use at elevated temperatures.

Suppressor elements suitable for use in spark plugs must have good mechanical and electrical stability at high temperatures, a wide operating temperature range, uniform resistance value and good suppression of high frequency oscillations associated with spark discharge in ignition systems.

The problem of eliminating radio frequency radiation from the high voltage ignition system of internal combustion engines has been of increasing concern in recent years because such radiation produces interference with the use of radio channels for communication and navigation. This problem has been accentuated by the increasing number of automobiles, boats and aircraft and the simultaneous increase in the use of radio frequency equipment in both communications and navigational equipment.

The typical ignition system for an internal combustion engine includes a set of breaker points, a capacitor, an ignition coil, a spark plug, and connection wires. When the breaker points are closed, a battery causes a current to flow in a primary winding of the ignition coil, thereby establishing a magnetic field about, and storing energy in, a ferrous core in the ignition coil. When the breaker points are opened, the magnetic field collapses and produces a high voltage across a secondary winding of the ignition coil. The high voltage is applied to, and arcs across, a spark gap in the spark plug, greatly decreasing the impedance of the gap. The secondary coil winding and the low impedance spark gap form a resonant circuit which oscillates as the energy stored in the core is dissipated. The oscillations are in the radio frequency spectrum and may cause severe noise and interference in both communications equipment and navigational equipment.

In the past, it has been found that random radio frequency radiation from the ignition system of internal combustion engines may be greatly reduced or eliminated by placing a resistance element in the high voltage ignition circuit for each spark plug. The resistance element may be positioned in the bore of a spark plug insulator, in series with the spark plug center electrode, or may be placed at some other convenient location in the ignition system, such as in a distributor rotor or distributed in the high voltage ignition cables.

Prior art suppressors, other than distributed resistances found in ignition cables, are generally either of a carbon rod type, of a wire wound type, of a sintered resistive rod type or of a resistive mass fired between the glass seals in the center electrode bore through a spark plug insulator. Each of the different types of suppressors has advantages and disadvantages. The carbon capsule suppressor is, for example, relatively inexpensive compared to a wire wound suppressor. The carbon capsule usually consists of carbon or graphite dispersed in a resinous binder. However, when the carbon capsule suppressor is placed in a spark plug and is heated to perhaps 450°F. or more during operation of the internal combustion engine, the carbon tends to oxidize, resulting in an open circuit due to rapidly increasing resistance levels as the carbon oxidizes, until a value of infinity is reached. Vitreous type carbon suppressor elements, formed from clay, talc and a refractory material having carbon distributed therein, have been used extensively. However, it is difficult to prepare such suppressors having uniform resistance values.

Wire wound suppressors do not possess as high a resistance level as carbon resistors because they suppress by inductive impedance rather than by resistance impedance. However, the wire wound suppressor is expensive compared to the carbon resistor and presents problems both in arcing and in connecting terminals to the wire ends. Wire wound suppressors are also bulky and, therefore, difficult to use in smaller size spark plugs.

Suppressor elements suitable for use in an internal combustion engine must withstand severe operating conditions involving pulsating high power loadings. The suppressor element must operate well at temperatures ranging from 200° to greater than 400°F. at 15,000 volts pulsating direct current.

In an attempt to overcome difficulties encountered with the use of carbon, other suppressor composition systems have been suggested. For example, U.S. Pat. Nos. 2,864,773 and 2,969,582 disclose the use of titanate and stano-titanate type materials modified to obtain desired electrical characteristics.

The Radio Manufacturers Association (RMA) and the Society of Automotive Engineers (SAE) have directed efforts toward determining limits for interference from internal combustion engines in communication and navigation equipment. As a result, the SAE has adopted limits for impulsive type interference and has included these limits in a uniform test standard SAE J551b, "Measurement of the Vehicle Radio Interference".

It is known that significant improvements can result in operation of communication and navigation equipment when engine-driven apparatus comply with the limits set forth in SAE J551b. Communications apparatus that operate in the frequency range 20–1000 megahertz which might be susceptible to radio frequency interference are very high frequency (VHF) television, ultra high frequency (UHF) television, frequency modulated (FM) radio, aircraft navigation and communication, amateur radio, telemetry, high frequency (HF) communications, UHF radar, and others.

The testing equipment required for SAE J551b is complex and expensive. However, satisfactory testing results can be obtained by comparing test samples with a wire wound suppressor and a carbon suppressor having known resistance and suppressing properties, and measuring the field intensity per unit band width within a given frequency range.

Manganese oxide and manganese-nickel oxide resistor elements are known in the art. However, such compositions have a relatively high temperature coefficient of resistance, which is undersirable in controlling radio frequency radiation.

SUMMARY OF THE INVENTION

The instant invention is based upon the discovery that a manganese oxide and manganese oxide-nickel matrix can be controlled and modified by means of incorporating strontium and aluminum atoms into the matrix in such a manner as to produce, after firing, a suppressor element having a relatively low negative temperature coefficient of resistance and good suppression characteristics. The manganese oxide and manganese oxide-nickel composition is modified in such a manner that the numerical value of the atom ratio $$\frac{Sr + Al}{Mn + Ni}$$

is maintained in the range 0.1 to 1.5. The atom ratio of strontium to aluminum is from 0.5:1 to 0.95:1. The manganese constitutes from 50 percent to 100 percent of the total number of atoms of manganese and nickel. The temperature coefficient of resistance of the suppressor ranges from −2.8%/°C to −1.3%/°C.

It is therefore an object of the present invention to provide a composition that has, after firing, a low temperature coefficient of resistance.

It is a further object of the present invention to provide a suppressor composition that has a high temperature stability.

It is a still further object of the present invention to provide a suppressor composition that is capable of suppressing unwanted radio frequency radiation in internal combustion engine ignition systems.

Other objects and advantages of the invention will become apparent from the following detailed description.

BRIEF DESCRIPTION OF THE DRAWINGS

FIG. 1 is a representation of the curve obtained from the measurement of the temperature coefficient of resistance of a series of manganese and manganese oxide-nickel suppressor elements showing the effect of varying the amounts of strontium, aluminum and nickel in the manganese oxide matrix, such that the $$\frac{Sr + Al}{Mn + Ni}$$

ratio is maintained from 0.1 to 1.5.

DESCRIPTION OF THE PREFERRED EMBODIMENTS

Example I

A series of manganese oxide suppressor compositions, modified with additions of strontium and alumina, was prepared by mixing together the materials listed below and firing to the temperature indicated. Test results obtained are listed in Table I. The compositions can be described as:

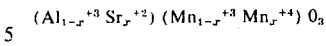

where an exchange of electrons between the +3 and +4 ions produces conductivity.

The ratio of Mn atoms to total Sr + Al modifying atoms was maintained at a 1:1 ratio, while the Sr/Al ratio was varied. As illustrated in Table I, experimental results obtained indicated that in order to induce semiconductivity at least 50 percent of the total Sr and Al modifying ions must be Sr.

TABLE I

| Material Added | Atom | Sample A | Sample B | Sample C | Sample D | Sample E | Sample F |
|---|---|---|---|---|---|---|---|
| $MnO_2$ | Mn | 63 | 63 | 63 | 63 | 63 | 63 |
| $SrCO_3$ | Sr | 20 | 36 | 40 | 32 | 40 | 50 |
| $Al_2O_3$ | Al | 43 | 27 | 23 | 34 | 25 | 14 |
| $\frac{Sr + Al}{Mn + Ni}$ | | 1.0 | 1.0 | 1.0 | 1.1 | 1.1 | 1.1 |
| Sintering Temperature (2 Hours) | | 2400°F | 2400°F | 2400°F | 2300° to 2400°F | 2300° to 2400°F | 2300° to 2400°F |
| $R_{25°C}$ (4V) | | ∞ | 6.5KΩ | 15KΩ | | | |
| n (%/°C)(± 0.1) | | — | −1.3 | −1.3 | −1.6 | −1.6 | −1.6 |

Sample B was compared for suppression of radio frequency interference against a carbon suppressor standard and a wire wound suppressor. Test results are shown in Table II below. Sample B compared favorably with both the carbon and wire wound suppressor; the measured amplitude was below the recommended limit of radiation suggested by SAE standards.

TABLE II

| Sample | Amplitude, dB |
|---|---|
| Sample B | −6 |
| Standard Carbon | 0 |
| Wire Wound | −5 |

The resistance at any temperature (from 25° to 250°C) can be expressed by the equation:

$$R_T = R_{25°C} \cdot \exp[n(T-25°C)].$$

where $R_T$ is the resistance at some temperature $T$, $R_{25°C}$ is room temperature resistance and n is the temperature coefficient of resistance. For manganese oxide and manganese oxide-nickel suppressors, n (in %/°C) is negative and defined by $$n = 2.303 \log_{10} \frac{(R_2)}{(R_1)} \times \frac{(1)}{(T_2-T_1)} \times 100 \text{ in } \%/°C$$

Example II

A series of manganese oxide suppressor compositions, additionally containing nickel oxide, modified with varying amounts of strontium and aluminum atoms, was prepared as described in Example I. Test results are listed in Table III.

TABLE III

| Material Added | Metal Atom | Atom Ratio | | | | | |
|---|---|---|---|---|---|---|---|
| | | Sample G | Sample H | Sample I | Sample J | Sample K | Sample L |
| $MnO_2$ | Mn | 65 | 63 | 63 | — | — | 63 |
| $Mn_3O_4$ | Mn | — | — | — | 63 | 63 | — |
| NiO | Ni | 20 | 20 | 20 | 20 | 20 | 20 |
| $SrCO_3$ | Sr | 9 | 32 | 40 | 32 | 40 | 63 |
| $Al_2O_3$ | Al | 3 | 34 | 25 | 34 | 25 | 60 |
| $\frac{Sr + Al}{Mn + Ni}$ | | 0.1 | 0.8 | 0.8 | 0.8 | 0.8 | 1.5 |
| Sintering Temperature (2 Hours) | | 2450°F | 2400°F | 2400°F | 2400°F | 2400°F | 2450°F |
| $R_{25}°$ $_c$(4V) | | — | 170KΩ | 30KΩ | 150KΩ | 30KΩ | — |
| n(%/°C) | | −2.8 | −2.3 | −1.9 | −2.3 | −2.0 | −1.5 |

TABLE IV

| Sample | Amplitude, dB |
|---|---|
| H | −2 |
| I | −1 |
| J | −1 |
| K | −2 |
| Standard Carbon | 0 |
| Wire Wound | −5 |

As indicated in Table III and Table IV, the samples had a low temperature coefficient of resistance, and compared favorably with both the standard carbon and wire wound suppressors.

Example III

A further series of manganese-oxide suppressor compositions, additionally containing nickel oxide, modified with varying amounts of strontium and aluminum atoms, was prepared as described in Example I. Test results, to determine the effect of nickel addition upon the temperature coefficient of resistance ($n$), are listed in Table V.

TABLE V

| Material Added | Metal Atom | Sample M | Sample N | Sample O |
|---|---|---|---|---|
| $MnO_2$ | Mn | 63 | 63 | 63 |
| NiO | Ni | 20 | — | 20 |
| $SrCO_3$ | Sr | 32 | 32 | 42 |
| $Al_2O_3$ | Al | 31 | 31 | 41 |
| $\frac{Sn + Al}{Mn + Ni}$ | | 0.76 | 1.00 | 1.00 |
| Sintering Temperature (2 Hours) | | 2400°F | 2400°F | 2400°F |
| n (%/°C) | | −2.4 | −1.3 | −1.8 |

As shown in the data in Table V when the ratio of $$\frac{Sr + Al}{Mn + Ni} = 1,$$

and no nickel is present, a minimum value of n is obtained. (Sample N) Addition of nickel atoms increases the value of $n$, even though the $$\frac{Sr + Al}{Mn + Ni}$$

ratio is maintained at 1. (Sample O)

It is apparent from the discussion of the modifying effect which the strontium atom exerts upon the manganese oxide or manganese oxide-nickel matrix that the strontium can be added in the form other than the carbonate, for example, as strontium oxide. For economic reasons, strontium carbonate is preferred. Firing of the green article converts the nickel present to nickel oxide, thus similar considerations apply to the choice of a nickel-containing compound.

COMPARATIVE PROCEDURE A

For purposes of comparison, but not in accordance with the invention, a series of suppressor compositions of manganese-nickel oxide and manganese-nickel-cobalt oxide not modified by the addition of strontium or aluminum atoms, was prepared and tested. The samples were prepared by sintering the oxides at 2200°F. for a period of 2 hours. Cylindrical samples 0.13 inch in diameter and 0.26 inch in length were tested.

The composition, $n$ and $R_{25°}$ $_c$ values for the samples are given in Table VI:

TABLE VI

| Material Added | Metal Atom | Composition of Mn-Ni-Co Oxide semiconductors by Atomic Ratio | | | |
|---|---|---|---|---|---|
| | | Sample P | Sample Q | Sample R | Sample S |
| $Mn_2O_3$ | Mn | 63 | 63 | 63 | 63 |
| $MnO_2$ | Mn | — | — | — | — |
| NiO | Ni | 10 | 10 | 10 | 10 |
| CoO | Co | — | 1 | 5 | 10 |
| $R_{25°}$ $_c$(0.26″) | | 1.7MΩ | 2.4MΩ | 2.2MΩ | 0.8MΩ |
| n (%/°C) | | −3.14 | −3.15 | −3.15 | −3.04 |

As indicated in Table VI, the $R_{25°}$ $_c$ values were all in the megohm range. The resistance decreased sharply as the samples experienced self-heating as indicated by the high temperature coefficient of resistance given in Table VI.

Other samples were prepared using $MnO_2$ as the source of manganese instead of $Mn_2O_3$. The $MnO_2$ compositions suffered from excessive cracking during firing at 2200°F. This was attributed to the volume changes that $MnO_2$ experiences during firing as shown below.

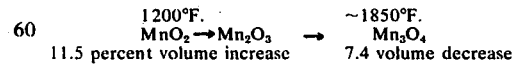

```
     1200°F.                ~1850°F.
MnO₂ → Mn₂O₃      →      Mn₃O₄
11.5 percent volume increase   7.4 volume decrease
```

Since the elements in a given chemical group have similar properties, the other members of the Group II chemical group were tested, as substitutes for strontium specifically, a series of manganese oxide-aluminum compositions modified with the oxides of magnesium, calcium and barium, as a substitute for strontium was prepared and tested. The magnesium, calcium and barium-containing compositions did not produce conducting oxides with controllable temperature coefficients of resistance, but produced instead, insulators.

COMPARATIVE PROCEDURE B

It is known in the art as disclosed in U.S. Pat. No. 2,864,773, that titanate and stanno-titanate materials can be modified with $Ta^{+5}$ to obtain semiconductor materials having low thermal coefficient of conductivity. Accordingly, manganese oxide and manganese-nickel oxide compositions were modified with $Ta^{+5}$, $Ti^{+4}$ and $Si^{+2}$ metal ions. Each composition was sintered at 2200°F. for 2 hours. Samples which displayed semiconductivity properties possessed temperature-resistance values similar to those obtained from manganese oxide bodies as described hereinbefore in Comparative Procedure A. As indicated in Table VII, the room temperature resistance ($R_{25}$ $_C$) values were all in the megohm range, and high values were obtained for the temperature coefficient of resistance (n).

TABLE VII

| Material Added | Atom | Sample T | Sample U | Sample V | Sample W |
|---|---|---|---|---|---|
| $MnO_2$ | Mn | 63 | 63 | 63 | 63 |
| NiO | Ni | 20 | 20 | 20 | — |
| SrO | Sr | — | — | — | 10 |
| $CeO_2$ | Ce | — | — | — | 3 |
| $SiO_2$ | Si | — | 10* | 10* | 10* |
| $TiO_2$ | Ti | 10* | 10* | — | — |
| $Ta_2O_5$ | Ta | — | — | 0.5* | — |
| $R_{25}°$ $_C$(4V) | | 10.9MΩ | ∞ | 40.9MΩ | 72.5MΩ |
| n (%/°C) | | −3.3 | — | −3.3 | −2.7 |

*Given in percent by weight.

A comparison of the test results described in Examples I, II and III with the test results described in Comparative Procedure A and B demonstrates a drastic improvement in the coefficient of resistance of a manganese oxide or manganese oxide-nickel composition when the composition is altered by the addition of aluminum and strontium atoms.

From the testing results given in Tables I, II and III, the following relationship can be demonstrated as to the effect that the stoichiometry of the $$\frac{(Sr + Al)}{(Mn + Ni)}$$

ratio has upon the value of $n$:

| | Atom Ratio, $\frac{Sr + Al}{Mn + Ni}$ | n(%/°C) |
|---|---|---|
| Table VI | 0.0 | −3.2 ± 0.1 |
| Table III | 0.1 | −2.8 ± 0.1 |
| Table III | 0.8 | −2.1 ± 0.2 |
| Table I | 1.0 | −1.3 ± 0.1 |
| Table I | 1.1 | −1.6 ± 0.1 |
| Table III | 1.5 | −1.5 ± 0.1 |

The above relationship is illustrated graphically in FIG. 1, which shows that the temperature coefficient of resistance of manganese oxide and manganese-nickel oxide semiconductor compositions, modified with Sr and Al atoms, can be controlled between about −2.8 and −1.3%/°C. by maintaining the $$\frac{Sr + Al}{Mn + Ni}$$

ratio from 0.1 to 1.5.

I claim:

1. An electrical semi-conductor suppressor element, said element consisting essentially of alumina, manganese oxide and strontium oxide as a modifying strontium compound and which also may contain nickel oxide, wherein the strontium/aluminum atom ratio has a value of about 0.5:1 to 0.95:1, wherein manganese constitutes from 50 percent to 100 percent based upon the total number of atoms of manganese and nickel, and wherein the proportions of alumina, manganese, nickel and strontium are such that the numerical value of the atom ratio $$\frac{Sr + Al}{Mn + Ni}$$

is from about 0.1 to 1.5, and wherein the temperature coefficient of resistance of the suppressor which is defined by the expression $$n = 2.303 \log_{10} \frac{(R_2)}{(R_1)} \times \frac{(1)}{(T_2 - T_1)} \times 100 \text{ in } \%/°C$$

is between about −2.8%/°C and −1.3% depending upon the value of the $$\frac{Sr + Al}{Mn + Ni}$$

atom ratio.

* * * * *